US009521407B2

(12) United States Patent
Zheng et al.

(10) Patent No.: US 9,521,407 B2
(45) Date of Patent: Dec. 13, 2016

(54) METHOD AND DEVICE FOR CODING AND DECODING IMAGES

(71) Applicant: Huawei Technologies Co., Ltd., Shenzhen (CN)

(72) Inventors: Xiaozhen Zheng, Shenzhen (CN); Haoping Yu, Bridgewater, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 659 days.

(21) Appl. No.: 13/945,541

(22) Filed: Jul. 18, 2013

(65) Prior Publication Data

US 2013/0301716 A1 Nov. 14, 2013

Related U.S. Application Data

(63) Continuation of application No. PCT/CN2012/070595, filed on Jan. 19, 2012.

(30) Foreign Application Priority Data

Jan. 19, 2011 (CN) .......................... 2011 1 0021897

(51) Int. Cl.
*H04N 7/26* (2006.01)
*H04N 7/12* (2006.01)
(Continued)

(52) U.S. Cl.
CPC ...... *H04N 19/00387* (2013.01); *H04N 19/119* (2014.11); *H04N 19/46* (2014.11);
(Continued)

(58) Field of Classification Search
CPC  H04N 19/00387; H04N 19/70; H04N 19/119; H04N 19/46; H04N 19/463; H04N 19/537; H04N 19/543
(Continued)

(56) References Cited

U.S. PATENT DOCUMENTS

2004/0028282 A1  2/2004 Kato et al.
2004/0156437 A1  8/2004 Lainema et al.
(Continued)

FOREIGN PATENT DOCUMENTS

CN  1457606 A  11/2003
CN  101005623 A  7/2007
(Continued)

OTHER PUBLICATIONS

Foreign Communication From a Counterpart Application, PCT Application No. PCT/CN2012/070595, Chinese Search Report dated Apr. 26, 2012, 6 pages.
(Continued)

*Primary Examiner* — Hee-Yong Kim
(74) *Attorney, Agent, or Firm* — Conley Rose, P.C.

(57) ABSTRACT

A method and a device for coding and decoding images are disclosed. The method for coding images includes: determining a second length according to a direction of a division line, a scale value, and a position parameter value; determining a division mode of the image block according to the direction of the division line, a first length, the second length, and the scale value; coding the image block according to the division mode of the image block; and coding a direction parameter value, the scale value, and the position parameter value. With the technical solution provided in the embodiments of the present invention, the determining of the division mode of the image block on the image coder is simplified.

14 Claims, 12 Drawing Sheets

(51) Int. Cl.
  *H04N 19/20*   (2014.01)
  *H04N 19/70*   (2014.01)
  *H04N 19/119*  (2014.01)
  *H04N 19/46*   (2014.01)
  *H04N 19/463*  (2014.01)
  *H04N 19/537*  (2014.01)
  *H04N 19/543*  (2014.01)

(52) U.S. Cl.
  CPC ......... *H04N 19/463* (2014.11); *H04N 19/537* (2014.11); *H04N 19/543* (2014.11); *H04N 19/70* (2014.11)

(58) Field of Classification Search
  USPC ...................................... 375/240.12
  See application file for complete search history.

(56) References Cited

U.S. PATENT DOCUMENTS

| | | | |
|---|---|---|---|
| 2008/0240246 A1* | 10/2008 | Lee | H04N 19/176 375/240.16 |
| 2009/0196517 A1 | 8/2009 | Divorra et al. | |
| 2010/0195715 A1 | 8/2010 | Liu et al. | |
| 2012/0177106 A1 | 7/2012 | Divorra et al. | |

FOREIGN PATENT DOCUMENTS

| | | |
|---|---|---|
| CN | 101415121 A | 4/2009 |
| JP | 10234041 A | 9/1998 |
| WO | 2008054688 A1 | 5/2008 |
| WO | 2008127568 A2 | 10/2008 |
| WO | 2009051719 A2 | 4/2009 |

OTHER PUBLICATIONS

Foreign Communication From a Counterpart Application, PCT Application No. PCT/CN2012/070595, Chinese Written Opinion dated Apr. 26, 2012, 4 pages.

Foreign Communication From a Counterpart Application, Chinese Application No. 201110021897.2, Chinese Search Report dated Sep. 10, 2013, 5 pages.

Adachi, S., et al., "Complexity Analysis of Improved MB Prediction Modes," Joint Video Team (JVT) of ISO/IEC MPEG & ITU-T VCEG (ISO/IEC JTC1/SC29/WG11 and ITU-T SG16 Q.6), 3rd Meeting; Fairfax, Virginia, JVT-C119, May 6-10, 2002, 8 pages.

Divorra, O., et al., "Geometry-Adaptive Block Partitioning on B-Frames," ITU—Telecommunications Standardization Sector, Study Group 16, Question 6, Video Coding Experts Group (VCEG), 33rd Meeting: Shenzhen, China, VCEG-AG13, Oct. 20, 2007, 10 pages.

Vermeirsch, K., et al., "New Macroblock Bipartitioning Modes for Inter Coding," ITU—Telecommunications Standardization Sector, Study Group 16, Question 6, Video Coding Experts Group (VCEG), 34th Meeting: Antalya, Turkey, VCEG-AH25, Jan. 12-13, 2008, 8 pages.

Dia, C., et al., "Geometry-Adaptive Block Partitioning for Intra Prediction in Image & Video Coding," IEEE International Conference on Image Processing, ICIP 2007, vol. 6, Sep. 16-Oct. 19, 2007, pp. 85-88.

Vermeirsch, K., et al., "Evaluation of Transform Performance when using Shape-Adaptive Partitioning in Video Coding," Picture Coding Symposium, PCS 2009, May 6-8, 2009, 4 pages.

"Series H: Audiovisual and Multimedia Systems, Infrastructure of Audiovisual Services—Coding of Moving Video, Advanced Video Coding for Generic Audiovisual Services," ITU-T, Telecommunication Standardization Sector of ITU, H.264, Mar. 2010, 676 pages.

Foreign Communication From a Counterpart Application, European Application No. 12736384.4, Extended European Search Report dated Feb. 27, 2014, 9 pages.

Kondo, S., et al., "Motion-Compensated Video Coding Using Sliced Blocks," Systems and Computers in Japan, vol. 38, No. 7, XP-002573852, Jan. 1, 2007, pp. 12-22.

Divorra, O., et al., "Geometry-Adaptive Block Partioning," ITU—Telecommunications Standardization Sector, Study Group 16, Question 6, Video Coding Experts Group (VCEG), 32nd Meeting, San Jose, CA, VCEG-AF10, XP030003531, Apr. 20-21, 2007, 8 pages.

Zheng, X., et al., "Flexible Macroblock Partition," JCTVC-A029, Hisilicon Technologies Co., Ltd, Dresden, DE, XP30007520, Apr. 15-23, 2010, 10 pages.

Chen, P., et al., "Geometry Motion Partition," JCTVC-B049, Joint Collaborative Team on Video Coding (JCT-VC) of ITU-T SG16 WP3 and ISO/IEC JTC1/SC29/WG11, 2nd Meeting: Geneva, CH, XP030007629, Jul. 21-28, 2010, 3 pages.

\* cited by examiner

METHOD AND DEVICE FOR CODING AND DECODING IMAGES

CROSS-REFERENCE TO RELATED APPLICATIONS

This application is a continuation of International Application No. PCT/CN2012/070595, filed on Jan. 19, 2012, which claims priority to Chinese Patent Application No. 201110021897.2, filed on Jan. 19, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a method and a device for coding and decoding images.

BACKGROUND

To reduce the bandwidth required for transmitting video data as much as possible, the video data may be compressed by using a plurality of video compression methods. The video compression methods include intra-frame compression and inter-frame compression. Nowadays, the inter-frame compression method based on motion estimation is prevalent. Specifically, the process of compressing and coding an image on a coder of the image by using an inter-frame compression method includes: The coder divides a to-be-coded image block into several equally sized image subblocks, and then, for each image subblock, searches among reference images for an image that most matches the current image subblock, and uses the most matched image as a prediction block; afterward, the coder performs a subtraction of the pixel value between the image subblock and the prediction block to obtain a residual, converts and quantizes the residual to obtain a value, performs entropy coding for the value, and finally, sends a bit stream and motion vector information that are derived from the entropy coding to a decoder, where the motion vector information represents a position difference between the current image subblock and the prediction block. On the decoder of the image, after obtaining the entropy-coded bit stream, the coder performs entropy decoding to obtain a corresponding residual and corresponding motion vector information, and then obtains a corresponding matching image block (that is, the prediction block) among the reference images according to the motion vector information, and then adds the value of each pixel in the matching image block to the value of the corresponding pixel in the residual values to obtain the value of each pixel in the current image subblock.

In existing video coding and decoding standards such as Moving Picture Experts Group (MPEG) and H.264/Advance Video Coding (AVC), an image block, also known as a macroblock or a super-macroblock, and the like, is divided into several image subblocks. The sizes of the image subblocks are 16×16, 16×8, 8×16, 8×8, 8×4, 4×8, 4×4, and the like. The motion estimation and the motion compensation are performed for the image subblocks based on such sizes. The coder of the image needs to send a codeword for identifying the division mode of the image block to the decoder of the image, and therefore, the decoder of the image knows the division mode applied on the coder of the image, and determines the corresponding prediction block according to the division mode and the motion vector information. In the existing video coding and decoding standards, the image subblocks are N×M rectangular blocks (N and M are integers greater than 0), and N is in a multiple relationship with M.

In the existing video coding and decoding standards, an image block is divided into rectangular blocks, and its disadvantage lies in that image texture information or object boundary information is not properly considered. An image generally includes texture information in various directions, and the texture generally corresponds to no rectangular areas. Moreover, an image generally includes multiple objects, and obvious boundaries exist between one object and another, or between an object and the image background. Therefore, a rectangular area may include information on two objects, or information on an object and the image background. From the perspective of image content, the rectangular area is divided into two areas that are not rectangular or symmetrically rectangular (or referred to as two irregularly divided areas). In this case, if motion estimation is performed by using the N×M rectangular blocks in the existing standards, the prediction result is not accurate.

To cope with such problems, a non-square division method is proposed, that is, a 2N×2N image block is divided into two image subblocks of any shape, where N is a positive integer greater than 0, and the shape of the image subblocks may be a triangle, a quadrangle, a pentagon, and the like. Because the 2N×2N image blocks introduce a non-square division method, an additional identification method is required by the image blocks for identifying the non-square division mode applied to the current image block. Currently available non-square division identification methods include image block geometry partition (geometry partition). The basic principles of the geometry partition method are to fit out a division line of an image block by defining an angle θ and a distance ρ, and use the division line to divide the image block into two image subblocks, where the two image subblocks may be in square or non-square shapes. The distance ρ refers to a distance from the center of the image block to the division line, as shown in FIG. 1; and the angle θ refers to a rotation angle of the division line of the image block against the X axis, as shown in FIG. 1. The division line is fitted out through the following formula:

$$y = \frac{-1}{\tan \theta} x + \frac{\rho}{\sin \theta} = mx + c.$$

The prior art is defective in the following aspects:

The division line of the image block needs to be fitted out through a formula, and the fitting process involves operations of multiplication, division, and trigonometric functions. An arbitrary block may be divided in more than one mode. For example, for an image block of a 16×16 size, if the angle θ increases from 0 to 360 degrees in increments of 11.25 degrees, and the distance ρ increases from 0 to a half of the perimeter of the image block in increments of 1 scalar (s), the division modes amount to (360/11.25)×8=256. If all division modes need to be fitted through the foregoing formula, it is rather complex for the image coder to determine the division mode of the image block.

SUMMARY

Embodiments of the present invention provide a method and a device for coding and decoding images, which can simplify the determining of a division mode of an image block on an image coder.

In view of the above, the embodiments of the present invention provide:

An image coding method, including: determining a second length according to a direction of a division line, a scale value, and a position parameter value; where the second length is a distance from a point existent on a boundary of an image block and corresponding to a point of the image block to an endpoint of the division line, the endpoint of the division line is an intersection point of the division line and the boundary of the image block or of the division line and an extension line of the boundary of the image block, and the position parameter value represents a relative position of the endpoint of the division line against a reference endpoint in a reference direction; determining a division mode of the image block according to the direction of the division line, a first length, the second length, and the scale value, and coding the image block according to the division mode of the image block, where the first length is a distance from the point of the image block to the boundary of the image block; and coding a direction parameter value, the scale value, and the position parameter value, where the direction parameter value represents the direction of the division line.

An image decoding method, including: parsing a code stream to obtain a direction parameter value, a scale value, and a position parameter value, where the direction parameter value represents a direction of a division line, the position parameter value represents a relative position of an endpoint of the division line against a reference endpoint in a reference direction, and the endpoint of the division line is an intersection point of the division line and a boundary of an image block or an extension line of the boundary of the image block; determining a second length according to the direction of the division line, the scale value, and the position parameter value, where the second length is a distance from a point existent on the boundary of the image block and corresponding to a point of the image block to the endpoint of the division line; and determining a division mode of the image block according to the direction of the division line, a first length, the second length, and the scale value, where the first length is a distance from the point of the image block to the boundary of the image block.

A coding device, including: a length determining unit configured to determine a second length according to a direction of a division line, a scale value, and a position parameter value; where the second length is a distance from a point existent on a boundary of an image block and corresponding to a point of the image block to an endpoint of the division line, the endpoint of the division line is an intersection point of the division line and the boundary of the image block or of the division line and an extension line of the boundary of the image block, and the position parameter value represents a relative position of the endpoint of the division line against a reference endpoint in a reference direction; a division mode determining unit configured to determine a division mode of the image block according to the direction of the division line, a first length, the second length, and the scale value, where the first length is a distance from the point of the image block to the boundary of the image block; and a coding unit configured to code the image block according to the division mode of the image block, and code a direction parameter value, the scale value, and the position parameter value, where the direction parameter value represents the direction of the division line.

A decoding device, including: a decoding unit configured to parse a code stream to obtain a direction parameter value, a scale value, and a position parameter value, where the direction parameter value represents a direction of a division line, and the position parameter value represents a relative position of an endpoint of the division line against a reference endpoint in a reference direction; a length determining unit configured to determine a second length according to the direction of the division line, the scale value, and the position parameter value, where the second length is a distance from a point existent on a boundary of an image block and corresponding to a point of the image block to the endpoint of the division line; and an image block division mode determining unit configured to determine a division mode of the image block according to the direction of the division line, a first length, the second length, and the scale value, where the first length is a distance from the point of the image block to the boundary of the image block.

In the embodiments of the present invention, a second length is determined according to a direction of a division line, a scale value, and a position parameter value indicative of a relative position of an endpoint of the division line against a reference endpoint in a reference direction, and a division mode of an image block is further determined according to the direction of the division line, a first length, the second length, and the scale value, where the first length is a distance from a point of the image block to a boundary of the image block, and the second length is a distance from a point existent on the boundary of the image block and corresponding to the point of the image block to the endpoint of the division line. In this way, no fitting of the division line is required, and the determining of the division mode of the image block on the image coder and the image decoder is simplified.

BRIEF DESCRIPTION OF THE DRAWINGS

To describe the technical solutions in the embodiments of the present invention more clearly, the following briefly introduces the accompanying drawing required for describing the embodiments of the present invention. Apparently, the accompanying drawing in the following description show merely some embodiments of the present invention, and persons of ordinary skill in the art may still derive other drawings from the accompanying drawing without creative efforts.

DETAILED DESCRIPTION

Figure 1:
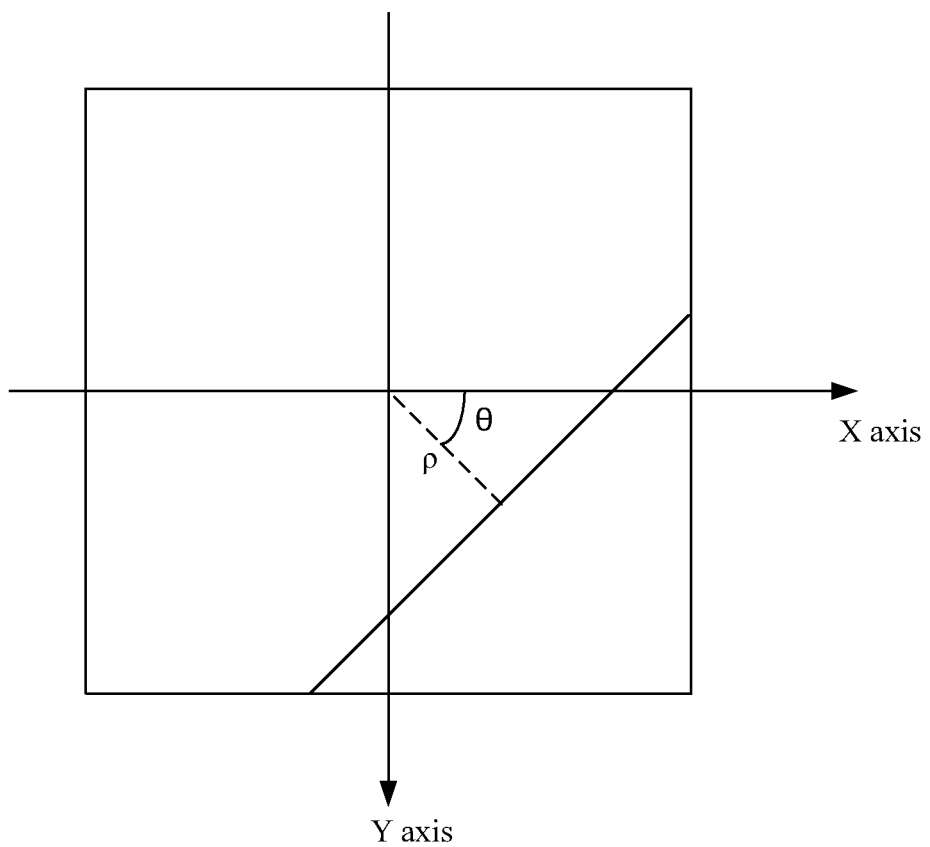
FIG. 1 is a schematic diagram of fitting a division line in the prior art.
Figure 2A:
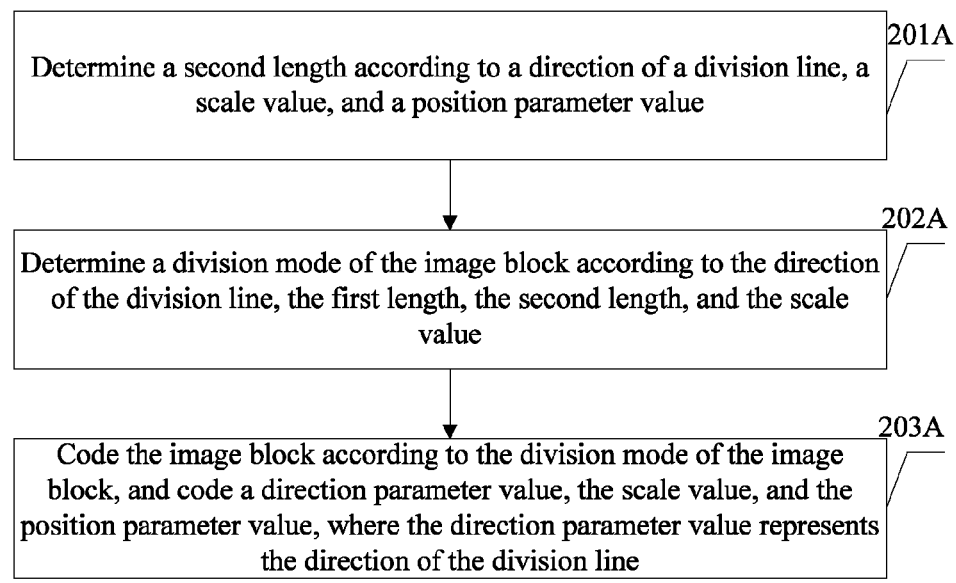
FIG. 2A is a flowchart of an image coding method according to an embodiment of the present invention.

Referring to FIG. 2A, an embodiment of the present invention provides an image coding method, including:

201A. Determine a second length according to a direction of a division line, a scale value, and a position parameter value.

Specifically, a first length and a second length may be determined according to the direction of the division line, the scale value, and the position parameter value; where the first length is a distance from a point of an image block to a boundary of the image block, and the second length is a distance from a point existent on the boundary of the image block and corresponding to the point of the image block to an endpoint of the division line, the endpoint of the division line is an intersection point of the division line and the boundary of the image block or of the division line and an extension line of the boundary of the image block, and the position parameter value represents a relative position of the endpoint of the division line against a reference endpoint in a reference direction.

The entity for performing steps of the embodiment is an image coder.

The reference direction may be a horizontal direction or a vertical direction. The point existent on the boundary of the image block and corresponding to the point of the image block is a projection point of the image block point vertically projected onto the boundary of the image block. When the boundary of the image block is an upper boundary or a lower boundary of the image block, the point existent on the boundary of the image block and corresponding to the point of the image block is a point existent on the boundary of the image block and sharing the same x-coordinate with the point of the image block. When the boundary of the image block is a left boundary or a right boundary of the image block, the point existent on the boundary of the image block and corresponding to the point of the image block is a point existent on the boundary of the image block and sharing the same y-coordinate with the point of the image block.

The scale value may represent a proportion of a first distance to a second distance, where the first distance is a distance from a non-boundary point on the division line to the boundary of the image block, and the second distance is a distance from a point existent on the boundary of the image block and corresponding to the non-boundary point on the division line to the endpoint of the division line. The point existent on the boundary of the image block and corresponding to the non-boundary point on the division line is a projection point of the division line non-boundary point vertically projected onto the boundary of the image block. When the boundary of the image block is an upper boundary or a lower boundary of the image block, the point existent on the boundary of the image block and corresponding to the point on the division line is a point existent on the boundary of the image block and sharing the same x-coordinate with the point on the division line. When the boundary of the image block is a left boundary or a right boundary of the image block, the point existent on the boundary of the image block and corresponding to the point on the division line is a point existent on the boundary of the image block and sharing the same y-coordinate with the point on the division line.

An absolute value of the position parameter value represents a distance between the endpoint of the division line and the reference endpoint in the reference direction, and a sign of the position parameter value indicates which side of the reference endpoint the endpoint of the division line is located on. When the reference direction is a horizontal direction, the sign of the position parameter value indicates whether the endpoint of the division line is located to the left or right of the reference endpoint; when the reference direction is a vertical direction, the sign of the position parameter value indicates whether the endpoint of the division line is located above or below the reference endpoint. The reference endpoint is an intersection point of the boundary of the image block and a line that is parallel to the division line and crosses a center of the image block.

The point of the image block in this embodiment may be a pixel of the image block, and the point on the division line is a pixel on the division line.

The determining a first length and a second length according to a direction of a division line, a scale value, and a position parameter value includes: determining coordinates of the reference endpoint as (0, N−N/scalar) when the direction of the division line is from upper left to lower right and coordinates at the center of the image block are (N−1, N), and determining coordinates of the reference endpoint as (0, N−1+N/scalar) when the direction of the division line is from upper right to lower left and the coordinates at the center of the image block are (N−1, N−1), where scalar is the scale value, the size of the image block is 2N×2N, and coordinates of the point at the upper left corner of the image block are (0, 0); determining a position of the endpoint of the division line according to the coordinates of the reference endpoint and the position parameter value; and determining the second length according to the position of the endpoint of the division line. Optionally, the first length and the second length may be determined according to the scale value and the position of the endpoint of the division line. The point at the upper left corner of the image block is a pixel at the upper left corner of the image block.

202A. Determine a division mode of the image block according to the direction of the division line, the first length, the second length, and the scale value.

The division mode of the image block represents the size and shape of image subblocks into which the image block will be divided.

Specifically, when the direction of the division line is from upper right to lower left, if L2 multiplied by scalar is greater than L1, the point of the image block belongs to a first image subblock; if L2 multiplied by scalar is less than L1, the point of the image block belongs to a second image subblock; if L2 multiplied by scalar is equal to L1, the point of the image block is located on the division line; when the direction of the division line is from upper left to lower right, if L2 multiplied by scalar is greater than −L1, the point of the image block belongs to the first image subblock; if L2 multiplied by scalar is less than −L1, the point of the image block belongs to the second image subblock; if L2 multiplied by scalar is equal to −L1, the point of the image block is located on the division line, where the division line belongs to the first image subblock and the second image subblock. The first image subblock may be located on the left of the image block, the second image subblock may be located on the right of the image block, and the first image subblock and the second image subblock are two image subblocks obtained by dividing the image block. L2 is a difference between the x-coordinate of the endpoint of the division line and the x-coordinate of the point existent on the boundary of the image block and corresponding to the point of the image block, and an absolute value of L2 is the second length. L1 is the first length. The boundary of the image block may be an upper boundary of the image block. The first image subblock may be image subblock 0 in FIG. 4, FIG. 5, FIG. 6, and FIG. 7, and the second image subblock may be image subblock 1 in FIG. 4, FIG. 5, FIG. 6, and FIG. 7.

203A. Code the image block according to the division mode of the image block, and code a direction parameter value, the scale value, and the position parameter value, where the direction parameter value represents the direction of the division line.

Specifically, when the direction parameter value, the scale value, and the position parameter value are coded in this step, the coding may be implemented by coding an index value corresponding to any of the three values and directly coding the remaining two values, that is, coding an index value corresponding to the direction parameter value and directly coding the scale value and the position parameter value, or, coding an index value corresponding to the scale value and directly coding the direction parameter value and the position parameter value, or, coding an index value corresponding to an absolute value of the position parameter value and directly coding the direction parameter value and the scale value.

Alternatively, when the direction parameter value, the scale value, and the position parameter value are coded in this step, the coding may be implemented by coding an index value corresponding jointly to two of the three values and coding the remaining value or coding an index value corresponding to the remaining value, where the remaining value is the value other than the two values among the direction parameter value, the scale value, and the position parameter value.

Alternatively, when the direction parameter value, the scale value, and the position parameter value are coded in this step, the coding may be implemented by coding an index value corresponding jointly to the direction parameter value, the scale value, and the position parameter value.

In the embodiment of the present invention, a second length is determined according to a direction of a division line, a scale value, and a position parameter value indicative of a relative position of an endpoint of the division line against a reference endpoint in a reference direction, and a division mode of an image block is further determined according to a first length, the second length, the direction of the division line, and the scale value, where the first length is a distance from a point of the image block to a boundary of the image block, and the second length is a distance from a point existent on the boundary of the image block and corresponding to the point of the image block to the endpoint of the division line. In this way, no fitting of the division line is required, and the determining of the division mode of the image block on the image coder is simplified.

Figure 2B:
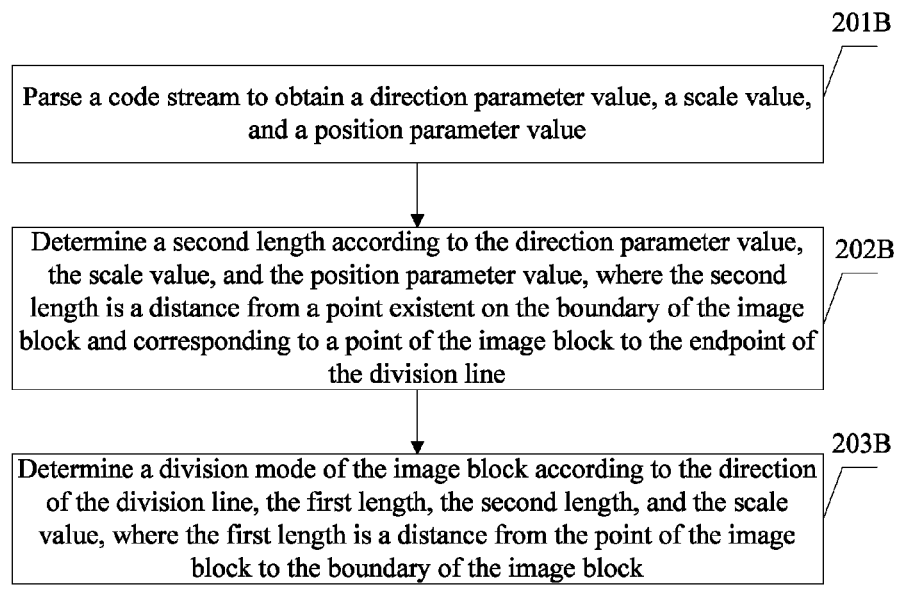
FIG. 2B is a flowchart of an image decoding method according to an embodiment of the present invention.

Referring to FIG. 2B, an embodiment of the present invention provides an image decoding method, including:

201B. Parse a code stream to obtain a direction parameter value, a scale value, and a position parameter value.

The entity for performing steps of the embodiment is an image decoder.

The definitions of the direction parameter value, the scale value, and the position parameter value are the same as those in the preceding embodiment, and are not repeated herein any further.

In this step, the parsing a code stream to obtain a direction parameter value includes: parsing the code stream to obtain a first index value and obtain a parameter value corresponding to the first index value, where the obtained parameter value is the direction parameter value; the parsing a code stream to obtain a scale value includes: parsing the code stream to obtain a second index value and obtain a parameter value corresponding to the second index value, where the obtained parameter value is the scale value; the parsing a code stream to obtain a position parameter value includes: parsing the code stream to obtain a third index value and obtain a parameter value corresponding to the third index value, where the obtained parameter value is an absolute value of the position parameter value; the parsing a code stream to obtain a direction parameter value, a scale value, and a position parameter value may include: parsing the code stream to obtain a fourth index value and a fifth index value; obtaining parameter values corresponding to the fourth index value, where the parameter values corresponding to the fourth index value include two of the three values: the direction parameter value, the scale value, and the position parameter value; obtaining a parameter value corresponding to the fifth index value, where the parameter value corresponding to the fifth index value is a remaining value other than the two among the three values: the direction parameter value, the scale value, and the position parameter value; or, parsing the code stream to obtain a fourth index value and one of the direction parameter value, the scale value, and the position parameter value; obtaining parameter values corresponding to the fourth index value, where the parameter values corresponding to the fourth index value include remaining two values other than the obtained one value among the three values: the direction parameter value, the scale value, and the position parameter value; or, parsing the code stream to obtain a sixth index value, and obtaining parameter values corresponding to the sixth index value, where the obtained parameter values include the direction parameter value, the scale value, and the position parameter value.

202B. Determine a second length according to the direction parameter value, the scale value, and the position parameter value.

Specifically, a first length and a second length may be determined according to the direction of the division line, the scale value, and the position parameter value; where the first length is a distance from a point of an image block to a boundary of the image block, the second length is a distance from a point existent on the boundary of the image block and corresponding to the point of the image block to an endpoint of the division line, and the endpoint of the division line is an intersection point of the division line and the boundary of the image block or of the division line and an extension line of the boundary of the image block.

The manner of determining the first length and the second length in this step is the same as that described in the preceding embodiment, and is not repeated herein any further. The point of the image block may be a pixel of the image block, and the point on the division line may be a pixel on the division line.

203B. Determine a division mode of the image block according to the direction of the division line, the first length, the second length, and the scale value.

The manner of determining the division mode of the image block in this step is the same as that described in the preceding embodiment, and is not repeated herein any further.

The division mode of the image block represents the size and shape of image subblocks into which the image block will be divided. Subsequently, according to the division mode of the image block, the image decoder may decode the result of the image block coded by the image coder to obtain the value of each pixel of the image block.

In the embodiment of the present invention, a second length is determined according to a direction of a division line, a scale value, and a position parameter value indicative of a relative position of an endpoint of the division line against a reference endpoint in a reference direction, and a division mode of an image block is further determined according to a first length, the second length, the direction of the division line, and the scale value, where the first length is a distance from a point of the image block to a boundary of the image block, and the second length is a distance from a point existent on the boundary of the image block and corresponding to the point of the image block to the endpoint of the division line. In this way, no fitting of the division line is required, and the determining of the division mode of the image block on the image decoder is simplified.

To increase comprehensibility of the technical solution provided in the embodiment shown in FIG. 2A, the following embodiment gives detailed description about the image coding method provided by embodiments of the present invention.

Figure 3:
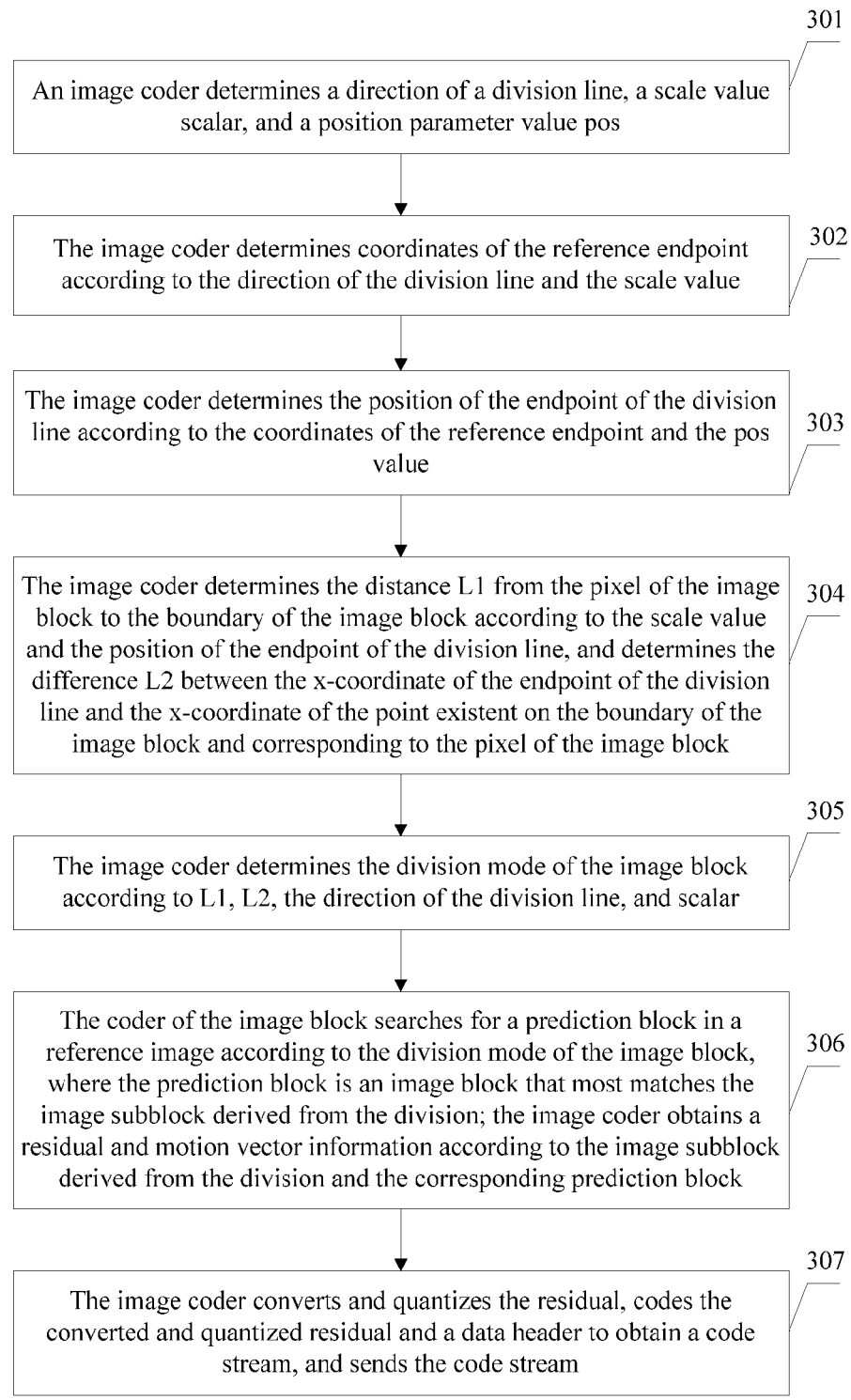
FIG. 3 is a flowchart of an image coding method according to another embodiment of the present invention.

FIG. 3 is a flowchart of an image coding method according to an embodiment of the present invention. The image coding method specifically includes:

Step 301: An image coder determines a direction of a division line, a scale value scalar, and a position parameter value pos.

Specifically, in this step, the image coder may determine the direction of the division line, the scale value, and the position parameter value according to a division command input by a user. The division command input by the user includes indication information about the direction of the division line, the scale value, and the position parameter value. The user may determine the direction of the division line, the scale value scalar, and the position parameter value pos according to the texture of the image, the boundary of the object, and the background boundary of the image. Alternatively, the image coder determines the direction of the division line, the scale value, and the position parameter value according to a specific rule. For example, the image coder may determine the direction of the division line, the scale value scalar, and the position parameter value pos according to the texture of the image, the boundary of the object, and the background boundary of the image.

The direction of the division line may be from upper left to lower right, or from upper right to lower left; the interrelated definitions of the scale value scalar and the position parameter value pos are the same as those in the embodiment corresponding to FIG. 2A, and are not repeated herein any further.

Specifically, in the embodiment of the present invention, it is assumed that the upper left corner of the image block is a coordinate origin, an oblique solid line represents the division line of the image block, and an oblique dashed line represents a datum line, where the datum line is a line that is parallel to the division line and crosses the center of the image block. The division line in the diagrams divides the image block into two image subblocks, that is, image subblock 0 and image subblock 1. The division line in FIG. 4 intersects the upper boundary of the image block at A, and intersects the left boundary of the image block at B; the division line in FIG. 5 intersects the extension line of the upper boundary of the image block at A, and intersects the extension line of the left boundary of the image block at B; the division line in FIG. 6 intersects the upper boundary of the image block at A; and the division line in FIG. 7 intersects the extension line of the upper boundary of the image block at A. The pixel Q is a pixel on the division line, and its coordinates are assumed as (y, x). The projection point of the pixel Q vertically projected onto the upper boundary of the image block (that is, the pixel existent on the upper boundary of the image block and sharing the same x-coordinate with the pixel) is Q'. As shown in the figure, the vertical distance from the pixel Q to the upper boundary of the image block is the y-coordinate of the pixel, that is, y. Assuming that the distance from the pixel Q' to the intersection point A is x', scalar is: scalar=y/x'.

Figure 4:
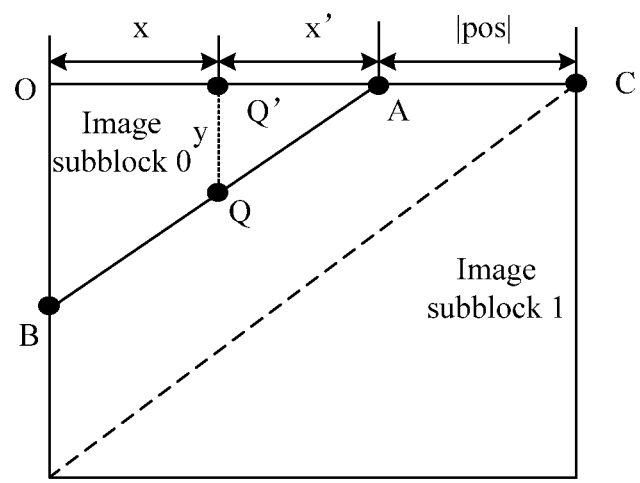
FIG. 4 is a schematic diagram of dividing an image along a direction from upper right to lower left according to an embodiment of the present invention.
Figure 5:
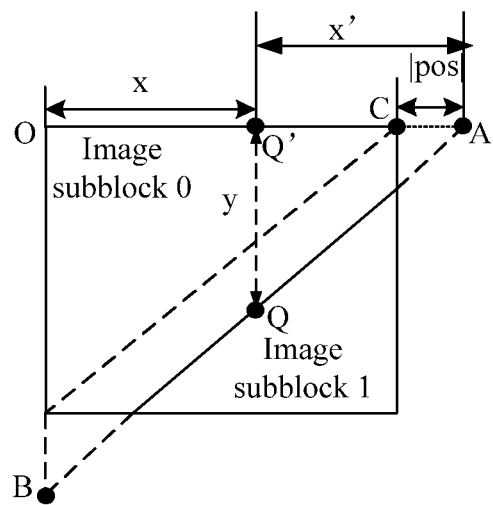
FIG. 5 is another schematic diagram of dividing an image along a direction from upper right to lower left according to an embodiment of the present invention.

For FIG. 4 and FIG. 5, if the pixel Q coincides with the intersection point B, scalar=BO/AO, where BO is a distance from the intersection point B to the pixel O, AO is a distance from the intersection point A to the pixel O, and the pixel O is located on the upper left corner of the image block.

It should be noted that in this step, once the value of scalar is definite, the angle between the division line and the horizontal direction is definite; the value of scalar may be 2, ½, 3, ⅓, 4, ¼, and the like, and correspondingly, the angle between the division line and the horizontal direction is 63.4 degrees, 26.6 degrees, 71.6 degrees, 18.4 degrees, 76 degrees, and 14 degrees, respectively.

Step 302: The image coder determines coordinates of the reference endpoint according to the direction of the division line and the scale value.

Figure 6:
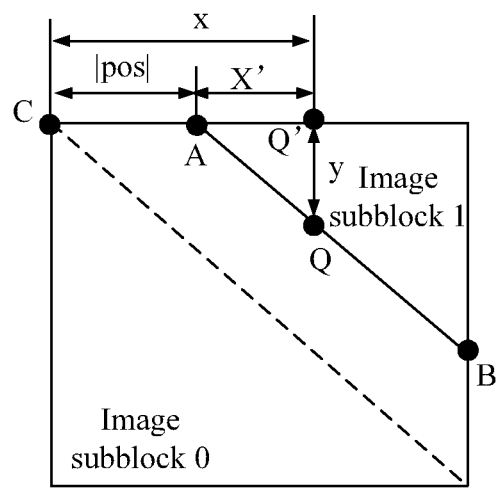
FIG. 6 is a schematic diagram of dividing an image along a direction from lower left to upper right according to an embodiment of the present invention.
Figure 7:
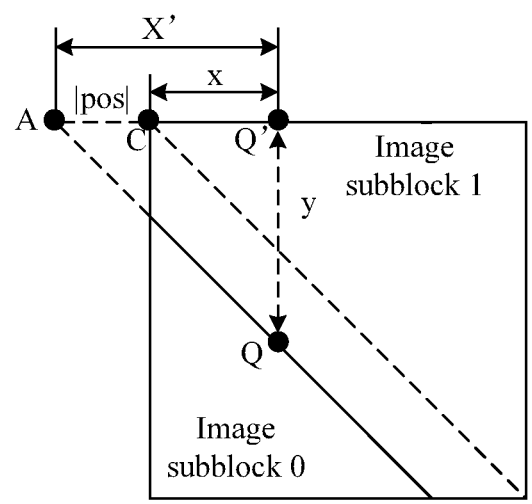
FIG. 7 is another schematic diagram of dividing an image along a direction from lower left to upper right according to an embodiment of the present invention.

As shown in FIG. 4 and FIG. 5, or as shown in FIG. 6 and FIG. 7, when pos is greater than 0 and less than 0, the position of the endpoint A of the division line differs. When two pos values have the same absolute value or different signs, the division line endpoint A corresponding to one pos value is symmetric to the division line endpoint A corresponding to the other pos value with respect to a reference endpoint C (that is, the intersection point of the division line and the upper boundary when the pos value is 0). Therefore, the position of the reference endpoint C decides the position of the intersection point of the division line and the upper boundary of the image or the extension line of the upper boundary when the pos value is not 0 (the endpoint A of the division line). That is, to effectively determine L1 (that is, the distance from the pixel of the image block to the boundary of the image block) of the pixel of the image block and L2 (that is, the difference between the x-coordinate of the endpoint of the division line and the x-coordinate of the point existent on the boundary of the image block and corresponding to the pixel of the image block), it is necessary to determine the position of the endpoint A of the division line, and hence necessary to determine the position of the reference endpoint.

To ensure high coding efficiency of any block division identification parameter (the direction parameter value, the scale value, and the position parameter value), when the pos value is 0, the division line should ensure equal division of the image block as far as possible. Therefore, when the pos value is 0, the division line should cross the center of the image block. It is assumed that the size of the image block is 2N×2N, coordinates of the pixel on upper left of the image block are (0, 0), and it is assumed that all points in the image block change by entire pixels only in the embodiment of the present invention, coordinates at the center of the image block may be (N−1, N−1) or (N, N−1) or (N−1, N) or (N, N). Specifically, when the direction of the division line is from upper left to lower right, the coordinates at the center of the image block are (N−1, N), and the coordinates of the reference endpoint are determined as (0, N−N/scalar); when the direction of the division line is from upper right to lower left, the coordinates at the center of the image block are (N−1, N−1), and the coordinates of the reference endpoint are determined as (0, N−1+N/scalar), where scalar is the scale value.

Figure 8:
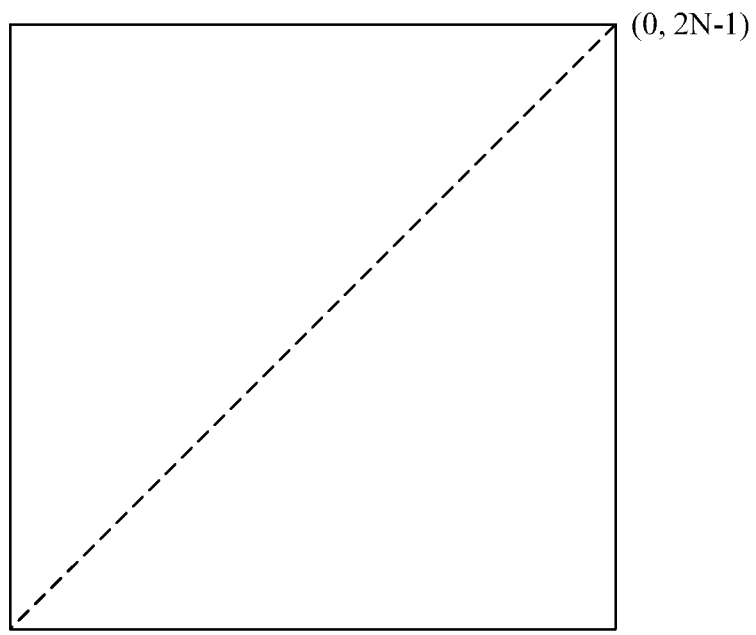
FIG. 8 is a position diagram of a reference endpoint when scalar=1 according to an embodiment of the present invention.
Figure 9:
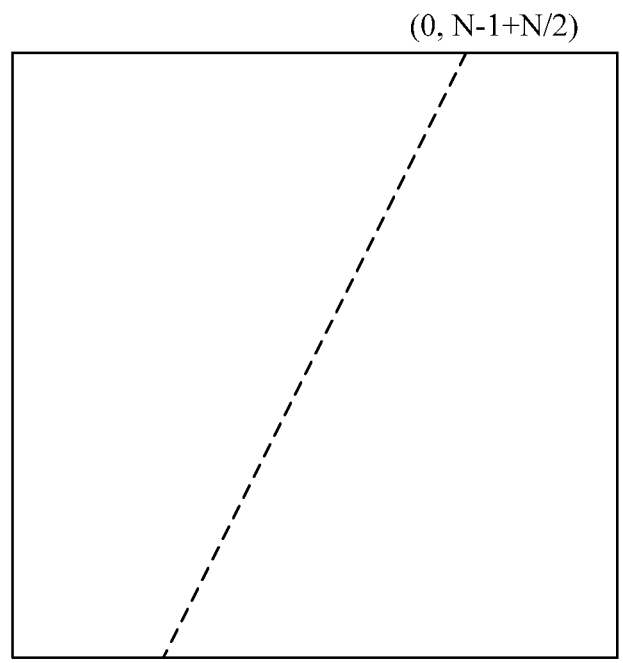
FIG. 9 is a position diagram of a reference endpoint when scalar=2 according to an embodiment of the present invention.
Figure 10:
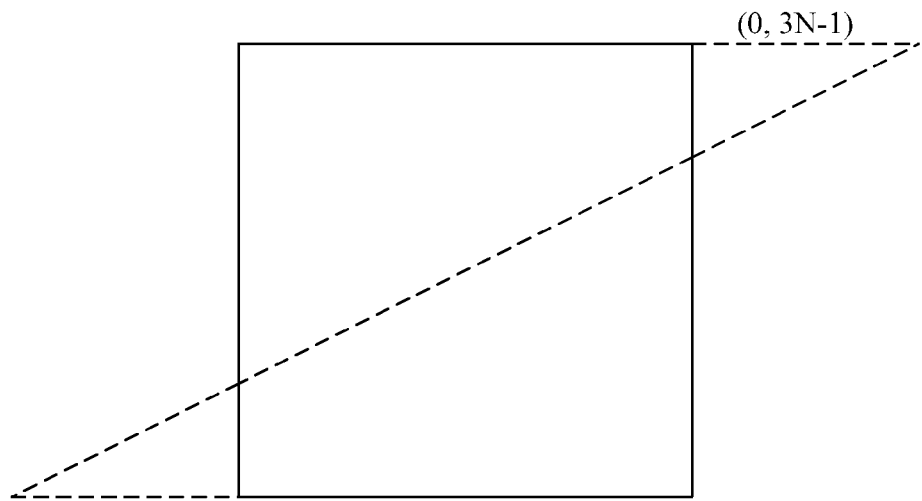
FIG. 10 is a position diagram of a reference endpoint when scalar=½ according to an embodiment of the present invention.
Figure 11:
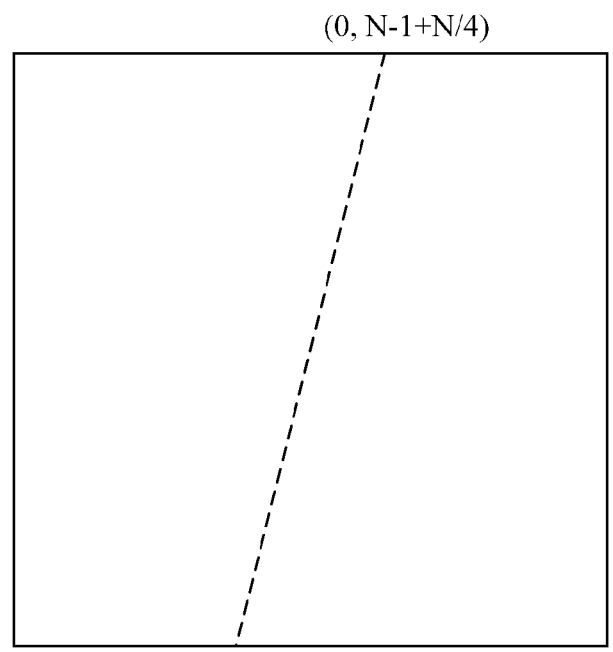
FIG. 11 is a position diagram of a reference endpoint when scalar=4 according to an embodiment of the present invention.
Figure 12:
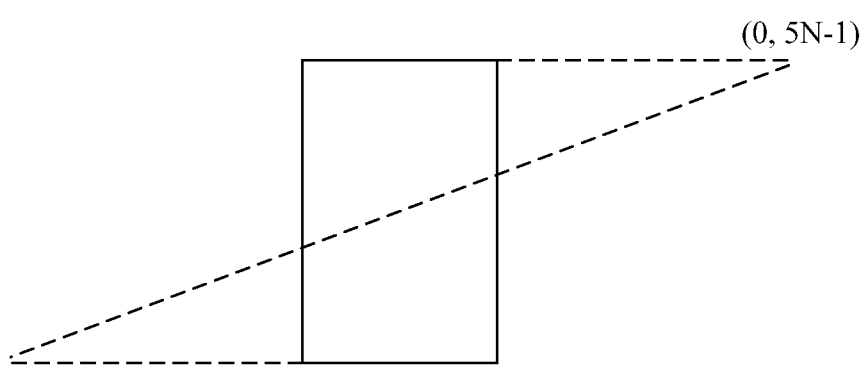
FIG. 12 is a position diagram of a reference endpoint when scalar=¼ according to an embodiment of the present invention.

The following describes the reference endpoint positions corresponding to different scalar values when the direction of the division line is from upper right to lower left: when scalar=1, the coordinates of the reference endpoint are (0, 2N−1), as shown in FIG. 8; when scalar=2, the coordinates of the reference endpoint are (0, N−1+N/2), as shown in FIG. 9; when scalar=½, the coordinates of the reference endpoint are (0, 3N−1), as shown in FIG. 10; when scalar=4, the coordinates of the reference endpoint are (0, N−1+N/4), as shown in FIG. 11; and when scalar=¼, the coordinates of the reference endpoint are (0, 5N−1), as shown in FIG. 12.

If the size of the image block is 16×16, that is, 2N=16, the reference endpoint positions corresponding to different scalar values are as follows: when scalar=1, the coordinates of the reference endpoint are (0, 15); when scalar=2, the coordinates of the reference endpoint are (0, 11); when scalar=½, the coordinates of the reference endpoint are (0, 23); when scalar=4, the coordinates of the reference endpoint are (0, 9); and when scalar=¼, the coordinates of the reference endpoint are (0, 39).

The following describes the reference endpoint positions corresponding to different scalars when the direction of the division line is from upper left to lower right: when scalar=1, the coordinates of the reference endpoint are (0, 0); when scalar=2, the coordinates of the reference endpoint are (0, N−1−N/2); when scalar=½, the coordinates of the reference endpoint are (0, N−1−2N); when scalar=4, the coordinates of the reference endpoint are (0, N−1−N/4); and when scalar=¼, the coordinates of the reference endpoint are (0, N−1−4N).

If the size of the image block is 16×16, that is, 2N=16, the reference endpoint positions corresponding to different scalar values are as follows: when scalar=1, the coordinates of the reference endpoint are (0, 0); when scalar=2, the coordinates of the reference endpoint are (0, 3); when scalar=½, the coordinates of the reference endpoint are (0, −9); when scalar=4, the coordinates of the reference endpoint are (0, 5); and when scalar=¼, the coordinates of the reference endpoint are (0, −25).

Step 303: The image coder determines the position of the endpoint of the division line according to the coordinates of the reference endpoint and the pos value.

On which side of the reference endpoint the endpoint of the division line is located is determined according to the sign of the pos value. When the reference direction is a horizontal direction, the sign of the pos value indicates whether the endpoint of the division line is located to the left or right of the reference endpoint; when the reference direction is a vertical direction, the sign of the pos value indicates whether the endpoint of the division line is located above or below the reference endpoint.

The distance between the endpoint of the division line and the reference endpoint is determined according to the absolute value of the pos value.

Coordinates of the endpoint of the division line are determined according to the side of the reference endpoint where the endpoint of the division line is located (that is, when the reference direction is a horizontal direction, the side is a left side or right side; when the reference direction is a vertical direction, the side is an upper side or lower side), the distance between the endpoint of the division line and the reference endpoint, and the coordinates of the reference endpoint.

Step 304: The image coder determines the distance L1 from the pixel of the image block to the boundary of the image block according to the scale value and the position of the endpoint of the division line, and determines the difference L2 between the x-coordinate of the endpoint of the division line and the x-coordinate of the point existent on the boundary of the image block and corresponding to the pixel of the image block.

Step 305: The image coder determines the division mode of the image block according to L1, L2, the direction of the division line, and scalar.

The division mode of the image block represents the size and shape of two image subblocks into which the image block will be divided. The two image subblocks may be irregular image subblocks, and the two irregular image subblocks may be in a triangular or pentagonal shape. Specifically, the two irregular image subblocks may be both triangular, or one image subblock is triangular and the other image subblock is pentagonal, or both image subblocks are pentagonal, which does not affect the implementation of the present invention.

Specifically, the following three methods may be used to judge whether a point of an image block belongs to image subblock 0 or image subblock 1.

Method 1: When the first parameter value is 0, that is, when the direction of the division line of the image block is from upper right to lower left, if L2 multiplied by scalar is greater than or equal to L1, the point of the image block belongs to image subblock 0; otherwise, the point of the image block belongs to image subblock 1.

When the first parameter value is 1, that is, when the direction of the division line of the image block is from upper left to lower right, if L2 multiplied by scalar is greater than or equal to −L1, the point of the image block belongs to image subblock 0; otherwise, the point of the image block belongs to image subblock 1.

Method 2: When the first parameter value is 0, that is, when the direction of the division line of the image block is from upper right to lower left, if L2 multiplied by scalar is greater than L1, the point of the image block belongs to image subblock 0; otherwise, the point of the image block belongs to image subblock 1.

When the first parameter value is 1, that is, when the direction of the division line of the image block is from upper left to lower right, if L2 multiplied by scalar is greater than −L1, the point of the image block belongs to image subblock 0; otherwise, the point of the image block belongs to image subblock 1.

Method 3: When the first parameter value is 0, that is, when the direction of the division line of the image block is from upper right to lower left, if L2 multiplied by scalar is greater than L1, the point of the image block belongs to image subblock 0, and, if L2 multiplied by scalar is less than L1, the point of the image block belongs to image subblock 1; otherwise, the point of the image block is located on the division line of the image block, where the division line may be located on image subblock 0 or image subblock 1.

When the first parameter value is 1, that is, when the direction of the division line of the image block is from upper left to lower right, if L2 multiplied by scalar is greater than −L1, the point of the image block belongs to image subblock 0, and, if L2 multiplied by scalar is less than −L1, the point of the image block belongs to image subblock 1; otherwise, the point of the image block is located on the division line of the image block, where the division line may be located on image subblock 0 or image subblock 1.

Step 306: The coder of the image block searches for a prediction block in a reference image according to the division mode of the image block, where the prediction block is an image block that most matches the image subblock derived from the division; the image coder obtains a residual and motion vector information according to the image subblock derived from the division and the corresponding prediction block.

The residual is a pixel value difference between a pixel of the image subblock derived from the division and a corresponding pixel of the prediction block, and the motion vector information represents a position difference between the image subblock derived from the division and the prediction block.

Step 307: The image coder converts and quantizes the residual, codes the converted and quantized residual and a data header to obtain a code stream, and sends the code stream.

The data header includes motion vector information, a direction parameter value indicative of the direction of the division line, a scale value scalar, a position parameter value pos, a sequence parameter set (sps), a picture parameter set (pps), a slice header, and the like. The manner of coding the direction parameter value, the scale value scalar, and the position parameter value pos will be detailed later.

In the embodiment of the present invention, a distance L1 from a pixel of an image block to a boundary of the image block is determined according to a direction of a division line, a scale value, and a position parameter value indicative of a relative position of an endpoint of the division line against a reference endpoint in a reference direction, and a difference L2 is determined between an x-coordinate of the endpoint of the division line and an x-coordinate of a point existent on the boundary of the image block and corresponding to the pixel of the image block; and a division mode of the image block is further determined according to L1, L2, the direction of the division line, and scalar. In this way, no fitting of the division line is required, and the determining of the division mode of the image block on the image coder is simplified.

Figure 13:
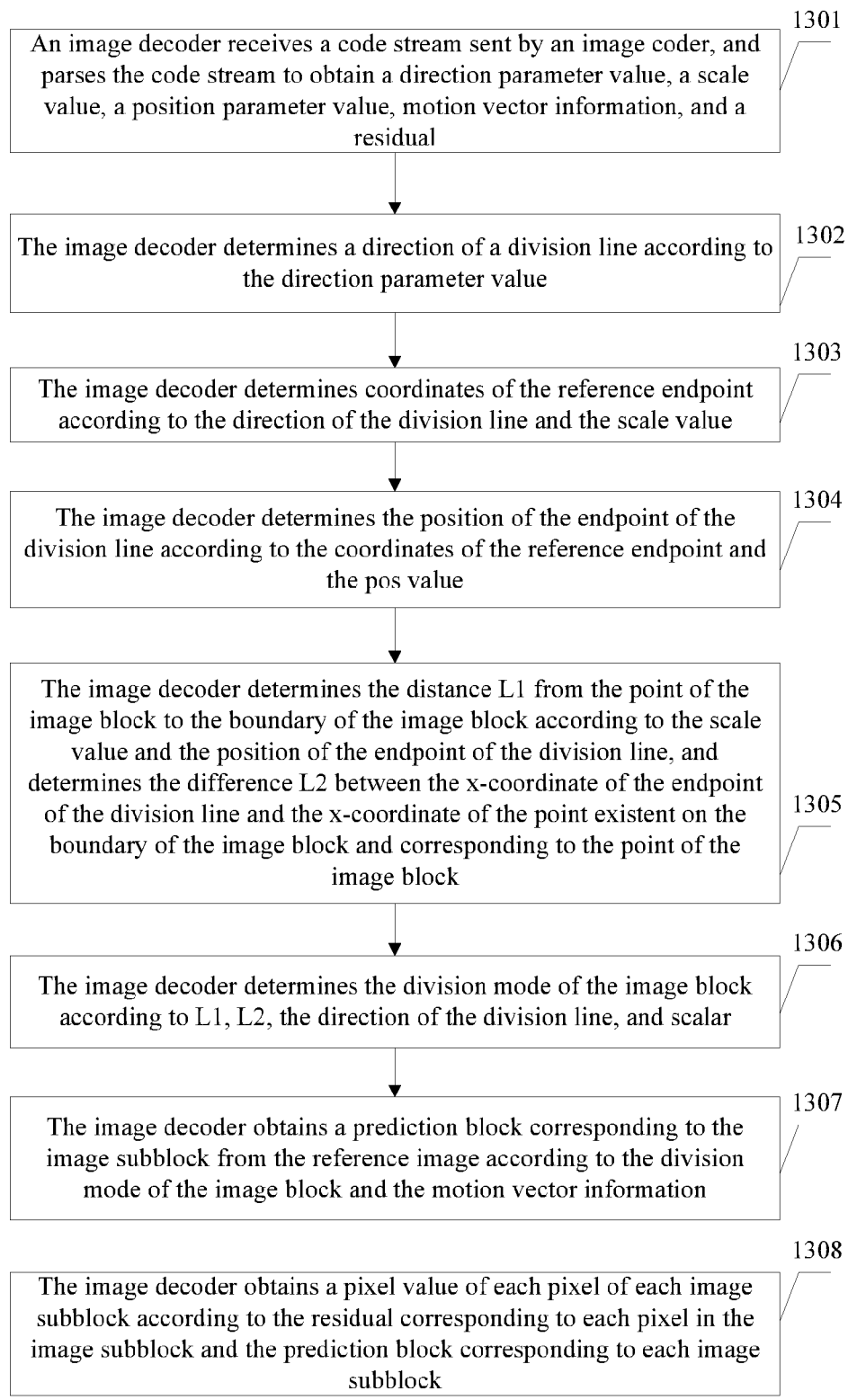
FIG. 13 is a flowchart of an image decoding method according to an embodiment of the present invention.

To increase comprehensibility of the technical solution provided in the embodiment corresponding to FIG. 2B, the following embodiment gives detailed description about the image decoding method provided herein:

FIG. 13 is a flowchart of an image decoding method according to an embodiment of the present invention. The image decoding method includes the following steps.

Step 1301: An image decoder receives a code stream sent by an image coder, and parses the code stream to obtain a direction parameter value, a scale value, a position parameter value, motion vector information, and a residual.

The definitions of the direction parameter value, the scale value, and the position parameter value are the same as those in the embodiments shown in FIG. 2A and FIG. 2B, and are not repeated herein any further.

Specifically, the process of parsing the code stream to obtain the direction parameter value, the scale value, and the position parameter value will be detailed later.

Step 1302: The image decoder determines a direction of a division line according to the direction parameter value.

Specifically, the image decoder determines, according to the direction parameter value, whether the direction of the division line is from upper right to lower left or from lower left to upper right.

Step 1303: The image decoder determines coordinates of the reference endpoint according to the direction of the division line and the scale value.

Specifically, the manner of determining a reference endpoint is similar to that described in step 302, and is not repeated herein any further.

Step 1304: The image decoder determines the position of the endpoint of the division line according to the coordinates of the reference endpoint and the pos value.

Specifically, the determining the position of the endpoint of the division line is similar to that described in step 303, and is not repeated herein any further.

Step 1305: The image decoder determines the distance L1 from the point of the image block to the boundary of the image block according to the scale value and the position of the endpoint of the division line, and determines the difference L2 between the x-coordinate of the endpoint of the division line and the x-coordinate of the point existent on the boundary of the image block and corresponding to the point of the image block.

Step 1306: The image decoder determines the division mode of the image block according to L1, L2, the direction of the division line, and scalar.

Specifically, the determining the division mode of the image block is similar to that described in step 305, and is not repeated herein any further.

Specifically, the pixel is located on the division line if the direction of the division line is from upper right to lower left and coordinates of the pixel (y, x) in the image block meet the following condition: TerminalPosi−pos−x=y/scalar.

The pixel is located on the division line if the direction of the division line is from upper left to lower right and the coordinates of the pixel (y, x) in the image block meet the following condition: x−TerminalPosi−pos=y/scalar, where TerminalPosi is an x-coordinate of the reference endpoint.

Because the image block is divided by the division line into two image subblocks, the pixel on the division line may belong to the image subblock numbered 0 or the image subblock numbered 1. The numbering of the image subblocks is shown in FIG. 4, FIG. 5, FIG. 6, and FIG. 7.

The pixel is located on image subblock 0 if the direction of the division line is from upper right to lower left and the coordinates of the pixel (y, x) in the image block meet the following condition: TerminalPosi−pos−x>y/scalar.

Otherwise, the pixel is located on image subblock 1.

The pixel is located on image subblock 0 if the direction of the division line is from upper left to lower right and the coordinates of the pixel (y, x) in the image block meet the following condition: x−TerminalPosi−pos<y/scalar.

Otherwise, the pixel is located on image subblock 1.

Step 1307: The image decoder obtains a prediction block corresponding to the image subblock from the reference image according to the division mode of the image block and the motion vector information.

Step 1308: The image decoder obtains a pixel value of each pixel of each image subblock according to the residual corresponding to each pixel in the image subblock and the prediction block corresponding to each image subblock.

In the embodiment of the present invention, a distance L1 from a pixel of an image block to a boundary of the image block is determined according to a direction of a division line, a scale value, and a position parameter value indicative of a relative position of an endpoint of the division line against a reference endpoint in a reference direction, and a difference L2 is determined between an x-coordinate of the endpoint of the division line and an x-coordinate of a point existent on the boundary of the image block and corresponding to the pixel of the image block; and a division mode of the image block is further determined according to L1, L2, the direction of the division line, and scalar. In this way, no fitting of the division line is required, and the determining of the division mode of the image block on the image decoder is simplified.

The following describes a process through which the image coder in step 307 codes the direction parameter value, the scale value, and the position parameter value, and a process through which the image decoder in step 1301 parses the code stream to obtain the direction parameter value, the scale value, and the position parameter value:

For the position parameter value pos, the image coder may code the absolute value and the sign of the pos separately. Specifically, when the pos absolute value is 0, the pos is preceded by no sign, and only the pos absolute value needs to be coded; when the pos absolute value is not 0, the pos is preceded by a sign, and both the absolute value and the sign of the pos need to be coded. When the pos absolute value is coded, the pos absolute value may change from 0 to 2, 4, 6, 8, 10, 12, and 14, that is, increase in increments of 2, with 2 being a fixed step size. In this case, the mapping between the pos absolute value and the index value is: the pos absolute value is equal to the index value multiplied by the fixed step size. In this case, the image coder does not need to code the pos absolute value, but needs to code the index value corresponding to the pos absolute value to obtain a codeword corresponding to the pos absolute value and write the codeword into a code stream. The corresponding index value may be 0, 1, 2, 3, 4, 5, 6, or 7. Subsequently, therefore, the image decoder parses the code stream to obtain the codeword corresponding to the pos absolute value first and obtain the index value corresponding to the pos absolute value, and then, according to the mapping between the pos absolute value and the index value, obtains the pos absolute value corresponding to the index value obtained through decoding. The fixed step size may be preset on the image coder and the image decoder, or sent by the image coder to the image decoder. If the fixed step size is sent by the image coder to the image decoder, the image coder may let a sequence parameter set, a picture parameter set, or a slice header carry the fixed step size to the image decoder.

The image decoder determines the mapping between the pos absolute value and the index value according to the fixed step size, and, by using the mapping between the pos absolute value and the index value, obtains the pos absolute value corresponding to the index value obtained through decoding.

The mapping between the pos absolute value and the index value may be a fixed mapping between the pos absolute value and the index value. For example, the pos absolute value is 0, 2, 5, 9, 10, 11, 13, and 15, respectively, and the corresponding index value is 0, 1, 2, 3, 4, 5, 6, and 7, respectively. The image coder may obtain the index value corresponding to the determined pos absolute value according to a preset mapping between the pos absolute value and the index value, code the index value to obtain a codeword corresponding to the pos absolute value, write the codeword into a code stream, and send the code stream to the image decoder. The image decoder parses the code stream to obtain the codeword corresponding to the pos absolute value, decodes the codeword to obtain the index value, and determines the pos absolute value corresponding to the index value according to the mapping between the pos absolute value and the index value.

The image coder may choose to use a fixed step size or use the fixed mapping between the pos absolute value and the index value. If a fixed step size is applied, the fixed step size may be carried in a sequence parameter set, a picture parameter set, or a slice header to the image decoder; if the fixed mapping between the pos absolute value and the index value is applied, information indicative of using a fixed mapping between the pos absolute value and the index value may be carried in a sequence parameter set, a picture parameter set, or a slice header to the image decoder.

For the scale value scalar, the image coder and the image decoder may preset a mapping between scalar and the index value. According to the mapping, the image coder obtains the index value corresponding to the determined scalar, codes the index value to obtain the codeword corresponding to scalar, writes the codeword into a code stream, and sends the code stream to the image decoder. Subsequently, the image decoder parses the code stream to obtain the codeword corresponding to the scale value and obtain the index value, and, according to the mapping between scalar and the index value, determines scalar corresponding to the index value obtained through parsing.

For the direction parameter value, the image coder and the image decoder may preset different index values corresponding to different directions of the division line. For example, the preset mapping is: when the direction of the division line is from upper left to lower right, the index value corresponding to the direction of the division line is 00; when the direction of the division line is from upper right to lower left, the index value corresponding to the direction of the division line is 01. According to the mapping between the direction of the division line and the index value, the image coder obtains the index value corresponding to the division line direction determined in step 301, codes the index value, writes the index value into a code stream, and sends the code stream to the image decoder. Subsequently, the image decoder parses the code stream to obtain the index value, and, according to the mapping, determines the division line direction corresponding to the index value obtained through parsing.

The index value corresponding to the direction parameter value, the index value corresponding to the position parameter value, and the index value corresponding to the scale value are coded respectively according to the mapping between the index value and the three values, thereby reducing the number of bits occupied by the coding and further shortening the code stream.

Optionally, as described above, the direction parameter value, the scale value, and the position parameter value have their respective corresponding index values. Alternatively, in another implementation manner, two of the direction parameter value, the scale value, and the position parameter value may correspond jointly to an index value. For example, the scale value and the position parameter value correspond jointly to an index value. For example, when the scale value is 2 and the position parameter value is 5, the corresponding index value is 10; when the scale value is ½ and the position parameter value is 5, the corresponding index value is 00. Alternatively, the direction parameter value, the scale value, and the position parameter value correspond jointly to an index value. For example, the corresponding index value is 001 when the direction of the division line is from upper left to lower right, the scale value is 2, and the position parameter value is 5; and the corresponding index value is 011 when the direction of the division line is from upper left to lower right, the scale value is ½, and the position parameter value is 6.

Figure 14:
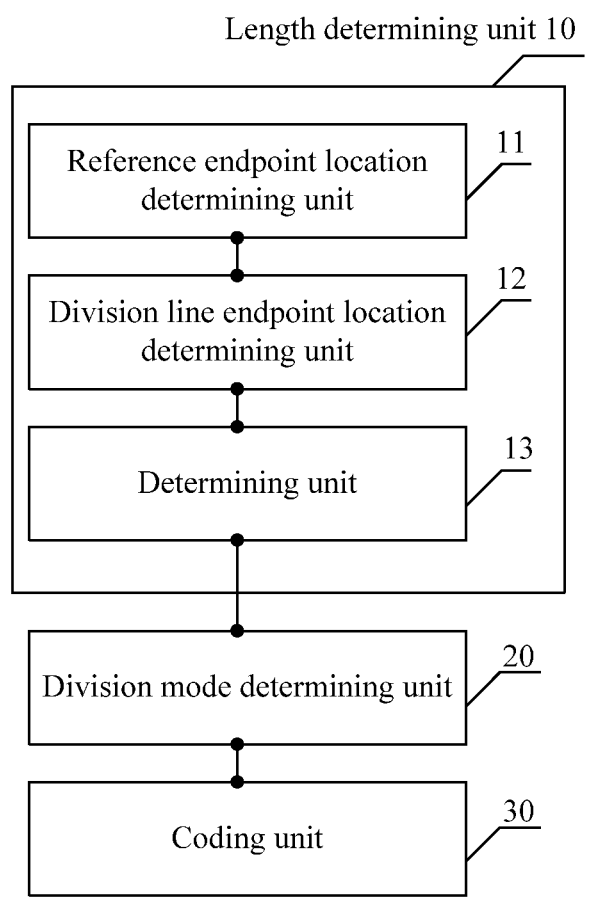
FIG. 14 is a structural diagram of a coding device according to an embodiment of the present invention.

Referring to FIG. 14, an embodiment of the present invention provides a coding device, which may be specifically an image coding device, including: a length determining unit 10 configured to determine a second length according to a direction of a division line, a scale value, and a position parameter value. Specifically, a first length and a second length may be determined according to the direction of the division line, the scale value, and the position parameter value, where the direction of the division line may be from upper left to lower right, or from upper right to lower left. The interrelated definitions of the scale value, the position parameter value, the first length, and the second length are the same as those given in the method embodiment, and are not repeated herein any further; a division mode determining unit 20 configured to determine a division mode of the image block according to the direction of the division line, the first length, the second length, and the scale value; and a coding unit 30 configured to code the image block according to the division mode of the image block, and code a direction parameter value, the scale value, and the position parameter value, where the direction parameter value represents the direction of the division line.

The reference endpoint is an intersection point of the boundary of the image block and a line that is parallel to the division line and crosses a center of the image block. The length determining unit 10 includes a reference endpoint position determining unit 11 configured to: determine coordinates of the reference endpoint as (0, N−N/scalar) when the direction of the division line is from upper left to lower right and coordinates at the center of the image block are (N−1, N), and determine coordinates of the reference endpoint as (0, N−1+N/scalar) when the direction of the division line is from upper right to lower left and the coordinates at the center of the image block are (N−1, N−1), where scalar is the scale value, the size of the image block is 2N×2N, and coordinates of the point on the upper left corner of the image block are (0, 0); a division line endpoint position determining unit 12 configured to determine a position of the endpoint of the division line according to the coordinates of the reference endpoint and the position parameter value; and a determining unit 13 configured to determine the second length according to the position of the endpoint of the division line, where the first length and the second length may be specifically determined according to the scale value and the position of the endpoint of the division line.

Specifically, the division mode determining unit 20 is configured to: determine that the point of the image block belongs to a first image subblock if L2 multiplied by scalar is greater than L1 when the direction of the division line is from upper right to lower left, determine that the point of the image block belongs to a second image subblock if L2 multiplied by scalar is less than L1, determine that the point of the image block is located on the division line if L2 multiplied by scalar is equal to L1, determine that the point of the image block belongs to the first image subblock if L2 multiplied by scalar is greater than −L1 when the direction of the division line is from upper left to lower right, determine that the point of the image block belongs to the second image subblock if L2 multiplied by scalar is less than −L1, and determine that the point of the image block is located on the division line if L2 multiplied by scalar is equal to −L1, where the division line belongs to the first image subblock and the second image subblock, the first image subblock and the second image subblock are two image subblocks obtained by dividing the image block, L2 is a difference between the x-coordinate of the endpoint of the division line and the x-coordinate of the point existent on the boundary of the image block and corresponding to the point of the image block, an absolute value of L2 is the second length, and L1 is the first length.

The coding unit 30 is specifically configured to code an index value corresponding to one of the direction parameter value, the scale value, and the position parameter value, and code remaining values other than the one value among the direction parameter value, the scale value, and the position parameter value; or the coding unit 30 is specifically configured to: code an index value corresponding jointly to two of the direction parameter value, the scale value, and the position parameter value, and code the remaining value or code an index value corresponding to the remaining value, where the remaining value is a value other than the two values among the direction parameter value, the scale value, and the position parameter value; or the coding unit is specifically configured to code an index value corresponding jointly to the direction parameter value, the scale value, and the position parameter value; the coding unit 30 codes the direction parameter value, the scale value, and the position parameter value by the foregoing means, thereby reducing the number of bits occupied by the parameters indicative of the division mode of the image block during the coding.

In the embodiment of the present invention, a first length and a second length are determined according to a direction of a division line, a scale value, and a position parameter value indicative of a relative position of an endpoint of the division line against a reference endpoint in a reference direction, where the first length is a distance from a point of the image block to a boundary of the image block, and the second length is a distance from a point existent on the boundary of the image block and corresponding to the point of the image block to the endpoint of the division line; and a division mode of the image block is further determined. In this way, no fitting of the division line is required, and the determining of the division mode of the image block on the image coding device is simplified.

Figure 15:
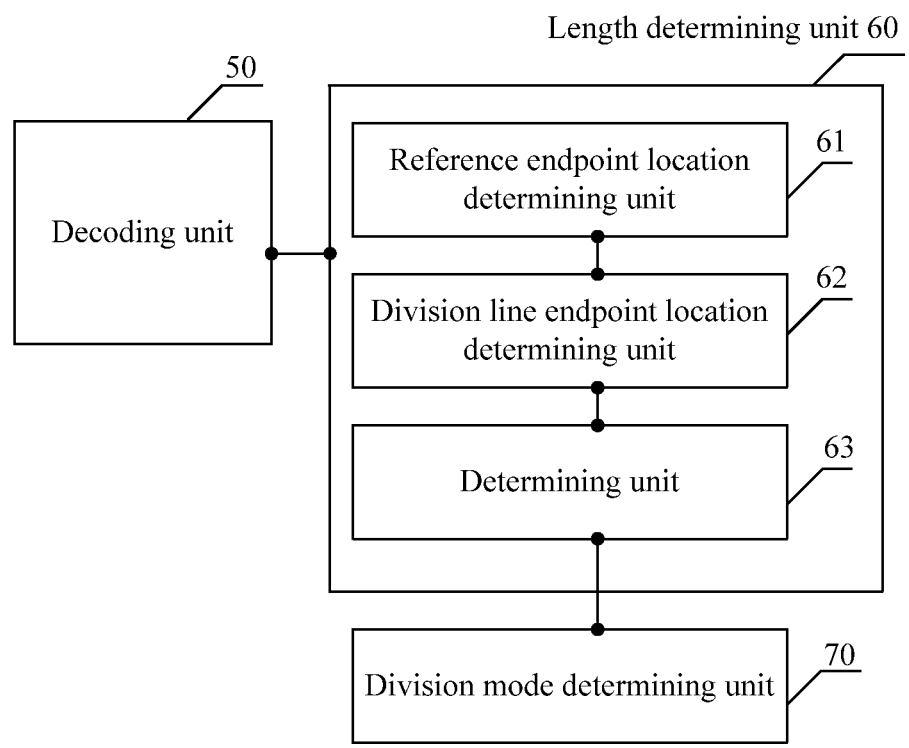
FIG. 15 is a structural diagram of a decoding device according to an embodiment of the present invention.

As shown in FIG. 15, an embodiment of the present invention provides a decoding device, which may be specifically an image decoding device, including: a decoding unit 50 configured to parse a code stream to obtain a direction parameter value, a scale value, and a position parameter value, where the code stream is sent by a coding device to the decoding device, and the interrelated definitions of the direction parameter value, the scale value, and the position parameter value are the same as those given in the method embodiment, and are not repeated herein any further; a length determining unit 60 configured to determine a second length according to the direction parameter value, the scale value, and the position parameter value; and specifically, determine a first length and a second length according to the direction parameter value, the scale value, and the position parameter value, where the interrelated definitions of the first length and the second length are the same as those given in the method embodiment and are not repeated herein any further; and an image division mode determining unit 70 configured to determine a division mode of the image block according to the direction of the division line, the first length, the second length, and the scale value.

The reference endpoint is an intersection point of the boundary of the image block and a line that is parallel to the division line and crosses a center of the image block. The length determining unit 60 includes a reference endpoint position determining unit 61 configured to: determine coordinates of the reference endpoint as (0, N−N/scalar) when the direction of the division line is from upper left to lower right and coordinates at the center of the image block are (N−1, N), and determine coordinates of the reference endpoint as (0, N−1+N/scalar) when the direction of the division line is from upper right to lower left and the coordinates at the center of the image block are (N−1, N−1), where scalar is the scale value, where the size of the image block is 2N×2N, and coordinates of the point on the upper left corner of the image block are (0, 0); a division line endpoint position determining unit 62 configured to determine a position of the endpoint of the division line according to the coordinates of the reference endpoint and the position parameter value; and a determining unit 63 configured to determine the second length according to the position of the endpoint of the division line, where the first length and the second length may be specifically determined according to the scale value and the position of the endpoint of the division line.

Specifically, the division mode determining unit 70 is configured to: determine that the point of the image block belongs to a first image subblock if L2 multiplied by scalar is greater than L1 when the direction of the division line is from upper right to lower left, determine that the point of the image block belongs to a second image subblock if L2 multiplied by scalar is less than L1, determine that the point of the image block is located on the division line if L2 multiplied by scalar is equal to L1, determine that the point of the image block belongs to the first image subblock if L2 multiplied by scalar is greater than −L1 when the direction of the division line is from upper left to lower right, determine that the point of the image block belongs to the second image subblock if L2 multiplied by scalar is less than −L1, and determine that the point of the image block is located on the division line if L2 multiplied by scalar is equal to −L1, where the division line belongs to the first image subblock and the second image subblock, the first image subblock and the second image subblock are two image subblocks obtained by dividing the image block, L2 is a difference between the x-coordinate of the endpoint of the division line and the x-coordinate of the point existent on the boundary of the image block and corresponding to the point of the image block, an absolute value of L2 is the second length, and L1 is the first length.

The decoding unit 50 includes: a first decoding unit configured to parse the code stream to obtain the direction parameter value; a second decoding unit configured to parse the code stream to obtain the scale value; and a third decoding unit configured to parse the code stream to obtain the position parameter value. The first decoding unit is configured to parse the code stream to obtain a first index value and obtain a parameter value corresponding to the first index value, where the obtained parameter value is the direction parameter value; and/or the second decoding unit is configured to parse the code stream to obtain a second index value and obtain a parameter value corresponding to the second index value, where the parameter value corresponding to the obtained second index value is the scale value; and/or the third decoding unit is configured to parse the code stream to obtain a third index value and obtain a parameter value corresponding to the third index value, where the parameter value corresponding to the obtained third index value is an absolute value of the position parameter value.

Alternatively, the decoding unit 50 is specifically configured to: parse the code stream to obtain a fourth index value and a fifth index value; obtain parameter values corresponding to the fourth index value, where the parameter values corresponding to the fourth index value include two of the three values: the direction parameter value, the scale value, and the position parameter value; obtain a parameter value corresponding to the fifth index value, where the parameter value corresponding to the fifth index value is a remaining value other than the two among the three values: the direction parameter value, the scale value, and the position parameter value; or the decoding unit 50 is specifically configured to: parse the code stream to obtain a fourth index value and one of the direction parameter value, the scale value, and the position parameter value; and obtain parameter values corresponding to the fourth index value, where the parameter values corresponding to the fourth index value include remaining two values other than the obtained one value among the three values: the direction parameter value, the scale value, and the position parameter value; or the decoding unit 50 is specifically configured to: parse the code stream to obtain a sixth index value; and obtain parameter values corresponding to the sixth index value, where the obtained parameter values include the direction parameter value, the scale value, and the position parameter value.

In the embodiment of the present invention, a first length and a second length are determined according to a direction of a division line, a scale value, and a position parameter value indicative of a relative position of an endpoint of the division line against a reference endpoint in a reference direction, where the first length is a distance from a point of the image block to a boundary of the image block, and the second length is a distance from a point existent on the boundary of the image block and corresponding to the point of the image block to the endpoint of the division line; and a division mode of the image block is further determined. In this way, no fitting of the division line is required, and the determining of the division mode of the image block on the image decoding device is simplified.

Figure 16:
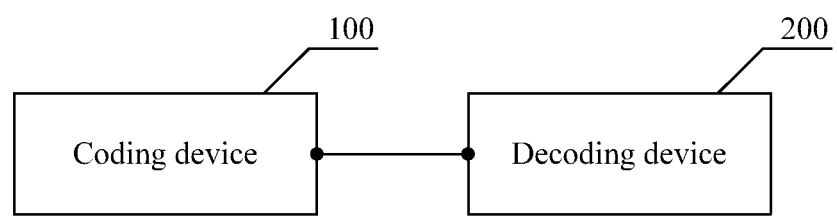
FIG. 16 is a structural diagram of a system according to an embodiment of the present invention.

As shown in FIG. 16, an embodiment of the present invention provides a network system, including a coding device 100 and a decoding device 200. For detailed structures of the units in the coding device 100 and the connection relationships thereof, refer to the description about the embodiment corresponding to FIG. 14; for detailed structures of the units in the decoding device 200 and the connection relationships thereof, refer to the description about the embodiment corresponding to FIG. 15; and they are not repeated herein any further. The network system determines a first length and a second length by using a direction of a division line, a scale value, and a position parameter value indicative of a relative position of an endpoint of the division line against a reference endpoint in a reference direction, where the first length is a distance from a point of the image block to a boundary of the image block, and the second length is a distance from a point existent on the boundary of the image block and corresponding to the point of the image block to the endpoint of the division line; and further determines a division mode of the image block. In this way, no fitting of the division line is required, and the determining of the division mode of the image block on the image coder is simplified.

Persons of ordinary skill in the art should understand that all or a part of the steps of the method in the embodiments may be implemented by a computer program instructing relevant hardware. The program may be stored in a computer readable storage medium such as a read-only memory, a disk, an optical disk, and the like.

The method and device for coding and decoding images according to the embodiments of the present invention are described in detail above. The principle and implementation manners of the present invention are described herein through specific examples. The description about the embodiments is merely provided for ease of understanding of the method and core ideas of the present invention. Persons of ordinary skill in the art can make modifications to the present invention in terms of the specific implementations and application scopes according to the ideas of the present invention. Therefore, the specification shall not be construed as a limitation to the present invention.

What is claimed is:

1. An image decoding method, comprising:
   parsing a code stream to obtain a direction parameter value, a scale value, and a position parameter value, wherein the direction parameter value represents a direction of a division line, wherein the position parameter value represents a relative position of an endpoint of the division line against a reference endpoint in a reference direction, and wherein the endpoint of the division line is an intersection point of the division line and a boundary of an image block or an extension line of the boundary of the image block;
   determining a second length according to the direction of the division line, the scale value, and the position parameter value, wherein the second length is a distance from the endpoint of the division line to a point on the boundary of the image block that corresponds to a point of the image block, wherein the point Oil the boundary of the image block comprises projection point of the image block point vertically projected onto the boundary of the image block, wherein the point on the boundary of the image block comprises a point existent on the boundary of the image block and sharing a same x-coordinate with the point of the image block when the boundary of the image block is an upper boundary or a lower boundary of the image block, and wherein the point on the boundary of the image block comprises a point existent on the boundary of the image block and sharing a same y-coordinate with the point of the image block when the boundary of the image block comprises a left boundary or a right boundary of the image block; and
   determining a division mode of the image block according to the direction of the division line, a first length, the second length, and the scale value, wherein the first length is a distance from the point of the image block to the boundary of the image block, and wherein the first length is determined according to the scale value and a position of the endpoint of the division line.

2. The method according to claim 1, wherein the reference endpoint comprises an intersection point of the boundary and a line that is parallel to the division line and that crosses a center of the image block.

3. The method according to claim 2, wherein determining the second length according to the direction of the division line, the scale value, and the position parameter value comprises:
   determining coordinates of the reference endpoint as (0, N−N/scalar) when the direction of the division line is from upper left to lower right and coordinates at the center of the image block are (N−1, N), and determining coordinates of the reference endpoint as (0, N−1+N/scalar) when the direction of the division line is from upper right to lower left and the coordinates at the center of the image block are (N−1, N−1), wherein scalar is the scale value, wherein the size of the image block is 2N×2N, and wherein coordinates of a point on an upper left corner of the image block are (0, 0);
   determining a position of the endpoint of the division line according to the coordinates of the reference endpoint and the position parameter value; and
   determining the second length according to the position of the endpoint of the division line.

4. The method according to claim 3, wherein determining the division mode of the image block according to the direction of the division line, the first length, the second length, and the scale value comprises:
   determining that the point of the image block belongs to a first image subblock when L2 multiplied by scalar is greater than L1 and the direction of the division line is from upper right to lower left;
   determining that the point of the image block belongs to a second image subblock when L2 multiplied by scalar is less than L1;
   determining that the point of the image block is located on the division line when L2 multiplied by scalar is equal to L1;
   determining that the point of the image block belongs to the first image subblock when L2 multiplied by scalar is greater than −L1 and the direction of the division line is from upper left to lower right;
   determining that the point of the image block belongs to the second image subblock when L2 multiplied by scalar is less than −L1; and
   determining that the point of the image block is located on the division line when L2 multiplied by scalar is equal to −L1,
   wherein the division line belongs to the first image subblock and the second image subblock,
   wherein the first image subblock and the second image subblock are two image subblocks obtained by dividing the image block,
   wherein L2 is a difference between an x-coordinate of the endpoint of the division line and an x-coordinate of the point existent on the boundary of the image block that corresponds to the point of the image block,
   wherein an absolute value of L2 is the second length, and wherein L1 is the first length.

5. The method according to claim 1, wherein parsing the code stream to obtain the direction parameter value comprises parsing the code stream to obtain a first index value and obtain a parameter value corresponding to the first index value, wherein the obtained par value is the direction parameter value; or wherein parsing the code stream to obtain the scale value comprises parsing the code stream to obtain a second index value and obtain a parameter value corresponding to the second index value, wherein the obtained parameter value is the scale value; or wherein parsing the code stream to obtain the position parameter value comprises parsing the code stream to obtain a third index value and obtain a parameter value corresponding to the third index value, wherein the obtained parameter value is an absolute value of the position parameter value; or wherein parsing the code stream to obtain the direction parameter value, the scale value, and the position parameter value comprises parsing the code stream to obtain a fourth index value and a fifth index value, obtaining parameter values corresponding to the fourth index value, wherein the parameter values corresponding to the fourth index value comprise two of the direction parameter value, the scale value, and the position parameter value, obtaining a parameter value corresponding to the fifth index value, wherein the parameter value corresponding to the fifth index value comprises a remaining value other than the two of the direction parameter value, the scale value, and the position parameter value; or wherein parsing the code stream to obtain the direction parameter value, the scale value, and the position parameter value comprises parsing the code stream to obtain a fourth index value and one of the direction parameter value, the scale value, and the position parameter value, obtaining parameter values corresponding to the fourth index value, wherein the parameter values corresponding to the fourth index value comprise a remaining two values other than the obtained one value among the direction parameter value, the scale value, and the position parameter value; or wherein parsing the code stream to obtain the direction parameter value, the scale value, and the position parameter value comprises parsing the code stream to obtain a sixth index value, and obtaining parameter values corresponding to the sixth index value, wherein the obtained parameter values comprise the direction parameter value, the scale value, and the position parameter value.

6. A coding device, comprising:
a nonvolatile computer-readable storage medium having instructions stored thereon; and
a computer processor coupled to the nonvolatile computer-readable storage medium and configured to execute the instructions to:
determine a second length according to a direction of a division line, a scale value, and a position parameter value, wherein the second length is a distance from an endpoint of the division line to a point on a boundary of an image block that corresponds to a point of the image block, wherein the point on the boundary of the image block comprises a projection point of the image block point vertically projected onto the boundary of the image block wherein the point on the boundary of the image block comprises a point existent on the boundary of the image block and sharing a same x-coordinate with the point of the image block when the boundary of the image block is an upper boundary or a lower boundary of the image block, wherein the point on the boundary of the image block comprises a point existent on the boundary of the image block and sharing a same y-coordinate with the point of the image block when the boundary of the image block comprises a left boundary or a right boundary of the image block, wherein the endpoint of the division line is an intersection point of the division line and the boundary of the image block or of the division line and an extension line of the boundary of the image block, and wherein the position parameter value represents a relative position of the endpoint of the division line against a reference endpoint in a reference direction;

determine a division mode of the image block according to the direction of the division line, a first length, the second length, and the scale value, wherein the first length is a distance from the point of the image block to the boundary of the image block, and wherein the first length is determined according to the scale value and a position of the endpoint of the division line;

code the image block according to the division mode of the image block, and code a direction parameter value, the scale value, and the position parameter value, wherein the direction parameter value represents the direction of the division line.

7. The coding device according to claim 6, wherein the reference endpoint is an intersection point of the boundary of the image block and a line that is parallel to the division line and that crosses a center of the image block, and wherein the computer processor is configured to execute the instructions to:
determine coordinates of the reference endpoint as (0, N−N/scalar) when the direction of the division line is from upper left to lower right and coordinates at the center of the image block are (N−1, N);
determine the coordinates of the reference endpoint as (0, N−1+N/scalar) when the direction of the division line is from upper right to lower left and the coordinates at the center of the image block are (N−1, N−1), wherein scalar is the scale value, wherein the size of the image block is 2N×2N, and wherein coordinates of a point on an upper left corner of the image block are (0, 0);
determine a position of the endpoint of the division line according to the coordinates of the reference endpoint and the position parameter value; and
determine the second length according to the position of the endpoint of the division line.

8. The coding device according to claim 7, wherein the computer processor is configured to execute the instructions to:
determine that the point of the image block belongs to a first image subblock when multiplied by scalar is greater than L1 and the direction of the division line is from upper right to lower left;
determine that the point of the image block belongs to a second image subblock when L2 multiplied by scalar is less than L1;
determine that the point of the image block is located on the division line when L2 multiplied by scalar is equal to L1;
determine that the point of the image block belongs to the first image subblock when L2 multiplied by scalar is greater than −L1 and the direction of the division line is from upper left to lower right;

determine that the point of the image block belongs to the second image subblock when L2 multiplied by scalar is less than −L1; and determine that the point of the image block is located on the division line when L2 multiplied by scalar is equal to −L1, wherein the division line belongs to the first image subblock and the second image subblock, wherein the first image subblock and the second image subblock are two image subblocks obtained by dividing the image block, wherein L2 is a difference between an x-coordinate of the endpoint of the division line and an x-coordinate of the point existent on the boundary of the image block that corresponds to the point of the image block, wherein an absolute value of L2 is the second length, and wherein L1 is the first length.

9. The coding device according to claim 6, wherein the computer processor is configured to execute the instructions to:

code an index value corresponding to one of the direction parameter value, the scale value, and the position parameter value, and code remaining values other than the one value among the direction parameter value, the scale value, and the position parameter value; or code an index value corresponding jointly to two of the direction parameter value, the scale value, and the position parameter value, and code the remaining value or code an index value corresponding to the remaining value, wherein the remaining value is a value other than the two values among the direction parameter value, the scale value, and the position parameter value; or code an index value corresponding jointly to the direction parameter value, the scale value, and the position parameter value.

10. A decoding device, comprising:

a nonvolatile computer-readable storage medium having instructions stored thereon; and a computer processor coupled to the nonvolatile computer-readable storage medium and configured to execute the instructions to:

parse a code stream to obtain a direction parameter value, a scale value, and a position parameter value, wherein the direction parameter value represents a direction of a division line, and wherein the position parameter value represents a relative position of an endpoint of the division line against a reference endpoint in a reference direction;

determine a second length according to the direction of the division line, the scale value, and the position parameter value, wherein the second length is a distance from the endpoint of the division line to a point on a boundary of an image block that corresponds to a point of the image block, wherein the point on the boundary of the image block comprises a projection point of the image block point vertically projected onto the boundary of the image block, wherein the point on the boundary of the image block comprises a point existent on the boundary of the image block and sharing a same x-coordinate with the point of the image block when the boundary of the image block is an upper boundary or a lower boundary of the image block, and wherein the point on the boundary of the image block comprises a point existent on the boundary of the image block and sharing a same y-coordinate with the point of the image block when the boundary of the image block comprises a left boundary or a right boundary of the image block; and determine a division mode of the image block according to the direction of the division line, a first length, the second length, and the scale value, wherein the first length is a distance from the point of the image block to the boundary of the image block, and wherein the first length is determined according to the scale value and a position of the endpoint of the division line.

11. The decoding device according to claim 10, wherein the reference endpoint is an intersection point of the boundary of the image block and a line that is parallel to the division line and that crosses a center of the image block, and wherein the computer processor is configured to execute the instructions to:

determine coordinates of the reference endpoint as (0, N−N/scalar) when the direction of the division line is from upper left to lower right and coordinates at the center of the image block are (N−1, N);

determine the coordinates of the reference endpoint as (0, N−1+N/scalar) when the direction of the division line is from upper right to lower left and the coordinates at the center of the image block are (N−1, N−1), wherein scalar is the scale value, wherein the size of the image block is 2N×2N, and wherein coordinates of a point on an upper left corner of the image block are (0, 0);

determining unit configured to determine a position of the endpoint of the division line according to the coordinates of the reference endpoint and the position parameter value; and determine the second length according to the position of the endpoint of the division line.

12. The decoding device according to claim 11, wherein the computer processor is configured to execute the instructions to:

determine that the point of the image block belongs to a first image subblock when L2 multiplied by scalar is greater than L1 and the direction of the division line is from upper right to lower left;

determine that the point of the image block belongs to a second image subblock when L2 multiplied by scalar is less than L1;

determine that the point of the image block is located on the division line when L2 multiplied by scalar is equal to L1;

determine that the point of the image block belongs to the first image subblock when L2 multiplied by scalar is greater than −L1 and the direction of the division line is from upper left to lower right;

determine that the point of the image block belongs to the second image subblock when L2 multiplied by scalar is less than −L1; and determine that the point of the image block is located on the division line when L2 multiplied by scalar is equal to −L1, wherein the division line belongs to the first image subblock and the second image subblock, wherein the first image subblock and the second image subblock are two image subblocks obtained by dividing the image block, wherein L2 is a difference between an x-coordinate of the endpoint of the division line and an x-coordinate of the point existent on the boundary of the image block that corresponds to the point of the image block, wherein an absolute value of L2 is the second length; and wherein L1 is the first length.

13. The decoding device according to claim 10, wherein the computer processor is configured to execute the instructions to:

parse the code stream to obtain the direction parameter value;

parse the code stream to obtain the scale value; and parse the code stream to obtain the position parameter value, wherein the code stream is parsed to obtain a first index value and obtain a parameter value corresponding to the first index value, wherein the obtained parameter value is the direction parameter value, and/or wherein the code stream is parsed to obtain a second index value and obtain a parameter value corresponding to the second index value, wherein the parameter value corresponding to the obtained second index value is the scale value, and/or wherein the code stream is parsed to obtain Z a third index value and obtain a parameter value corresponding to the third index value, wherein the parameter value corresponding to the obtained third index value is an absolute value of the position parameter value.

14. The decoding device according to claim 10, wherein the computer processor is configured to execute the instructions to:

parse the code stream to obtain a fourth index value and a fifth index value; obtain parameter values corresponding to the fourth index value, wherein the parameter values corresponding to the fourth index value comprise two of the direction parameter value, the scale value, and the position parameter value; obtain a parameter value corresponding to the fifth index value, wherein the parameter value corresponding to the fifth index value is a remaining value other than the two of the direction parameter value, the scale value, and the position parameter value; or parse the code stream to obtain a fourth index value and one of the direction parameter value, the scale value, and the position parameter value; and obtain parameter values corresponding to the fourth index value, wherein the parameter values corresponding to the fourth index value comprise a remaining two values other than the obtained one value of the direction parameter value, the scale value, and the position parameter value; or parse the code stream to obtain a sixth index value; and obtain parameter values corresponding to the sixth index value, wherein the obtained parameter values comprise the direction parameter value, the scale value, and the position parameter value.

\* \* \* \* \*

UNITED STATES PATENT AND TRADEMARK OFFICE
CERTIFICATE OF CORRECTION

| | | |
|---|---|---|
| PATENT NO. | : 9,521,407 B2 | Page 1 of 1 |
| APPLICATION NO. | : 13/945541 | |
| DATED | : December 13, 2016 | |
| INVENTOR(S) | : Zheng et al. | |

It is certified that error appears in the above-identified patent and that said Letters Patent is hereby corrected as shown below:

In the Claims

Column 21, Lines 49-50, Claim 1 should read:
"wherein the point on the boundary of the image block comprises a projection point of the image block point vertically projected onto the boundary of the image block,"

Column 23, Line 2, Claim 5 should read:
"wherein the obtained parameter value is the direction parameter value; or"

Column 24, Line 55, Claim 8 should read:
"determine that the point of the image block belongs to a first image subblock when L2 multiplied by scalar is greater than L1 and the direction of the division line is from upper right to lower left;"

Column 26, Line 28, Claim 11 should read:
"determine a position of the endpoint of the division line according to the coordinates of the reference endpoint and the position parameter value; and"

Column 27, Line 18, Claim 13 should read:
"wherein the code stream is parsed to obtain a third index value and obtain a parameter value corresponding to the third index value,"

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*